US009996270B2

(12) United States Patent
Guo et al.

(10) Patent No.: US 9,996,270 B2
(45) Date of Patent: Jun. 12, 2018

(54) STORAGE IN TIERED ENVIRONMENT WITH CACHE COLLABORATION

(71) Applicant: INTERNATIONAL BUSINESS MACHINES CORPORATION, Armonk, NY (US)

(72) Inventors: Yong Guo, Shanghai (CN); Bruce McNutt, Gilroy, CA (US); Jie Tian, Shanghai (CN); Yan Xu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 14/325,983

(22) Filed: Jul. 8, 2014

(65) Prior Publication Data

US 2016/0011819 A1 Jan. 14, 2016

(51) Int. Cl.
*G06F 3/06* (2006.01)

(52) U.S. Cl.
CPC .............. *G06F 3/061* (2013.01); *G06F 3/0608* (2013.01); *G06F 3/0649* (2013.01); *G06F 3/0685* (2013.01)

(58) Field of Classification Search
CPC ............... G06F 12/0246; G06F 3/0685; G06F 12/0866; G06F 3/0647; G06F 3/061; G06F 12/0897; G06F 12/0804; G06F 2212/202; G06F 3/0649; G06F 2212/222; G06F 2212/205; G06F 3/0611; G06F 2212/1024; G06F 2212/608; G06F 3/0619; G06F 12/0868; G06F 3/0679; G06F 12/0238; G06F 2212/217; G06F 3/068; G06F 11/108; G06F 3/0683; G06F 12/0877; G06F 13/1657; G06F 11/3058; G06F 11/3409; G06F 2009/45579; G06F 2212/2022; G06F 3/0604; G06F 3/0631; G06F 11/141; G06F 3/0653; G06F 11/008; G06F 2212/1032
USPC ......... 711/103, E12.008, 113, E12.001, 102, 711/118, 165, 104, 122, 154, E12.002, (Continued)

(56) References Cited

U.S. PATENT DOCUMENTS 8,429,307 B1 4/2013 Faibish et al.
8,463,825 B1 * 6/2013 Harty ................ G06F 17/30233
                                                                  707/813
8,661,196 B2 2/2014 Eleftheriou et al.
(Continued)

OTHER PUBLICATIONS

Sehgal et al., "SLO-aware hybrid store." 17 pages, Mass Storage Systems and Technologies (MSST), 2012 IEEE 28th Symposium on. IEEE, 2012.

*Primary Examiner* — Tuan Thai
*Assistant Examiner* — Edward Waddy, Jr.
(74) *Attorney, Agent, or Firm* — Griffiths & Seaton PLLC

(57) ABSTRACT

Various embodiments for managing data by a processor in a multi-tiered computing storage environment. Input/Output (I/O) statistics are examined from each of cache and device drivers in the computing storage environment. Based on the I/O statistics, a ranking mechanism is applied to differentiate data between at least a cache rank and a Solid State Drive (SSD) rank. The ranking mechanism migrates data between the cache rank and SSD rank such that storage space in the cache rank is reserved for those of the plurality of data workload types having a greater adverse effect on a storage performance characteristic if stored in the SSD rank than if those workload types were stored in the cache rank.

18 Claims, 7 Drawing Sheets

(58) Field of Classification Search
USPC ........ 711/105, 112, 170, E12.093, 100, 101, 711/135, 163
See application file for complete search history.

(56) References Cited

U.S. PATENT DOCUMENTS

| | | | |
|---|---|---|---|
| 9,330,009 B1* | 5/2016 | Throop | G06F 12/0866 |
| 2008/0109629 A1* | 5/2008 | Karamcheti | G06F 9/5016 |
| | | | 711/170 |
| 2008/0177978 A1* | 7/2008 | Karamcheti | G06F 9/5016 |
| | | | 711/206 |
| 2010/0199036 A1 | 8/2010 | Siewert et al. | |
| 2010/0281230 A1* | 11/2010 | Rabii | G06F 3/0605 |
| | | | 711/165 |
| 2011/0239013 A1* | 9/2011 | Muller | G06F 1/3221 |
| | | | 713/320 |
| 2012/0246403 A1* | 9/2012 | McHale | G06F 3/0604 |
| | | | 711/114 |
| 2013/0054882 A1 | 2/2013 | Ryu | |
| 2013/0086324 A1 | 4/2013 | Soundararajan et al. | |
| 2013/0132638 A1* | 5/2013 | Horn | G06F 12/0871 |
| | | | 711/103 |
| 2013/0166724 A1 | 6/2013 | Bairavasundaram et al. | |
| 2013/0166816 A1* | 6/2013 | Atkisson | G06F 12/0802 |
| | | | 711/102 |
| 2013/0346538 A1 | 12/2013 | Blinick et al. | |
| 2014/0019707 A1 | 1/2014 | Benhase et al. | |
| 2014/0032861 A1 | 1/2014 | Islam et al. | |

* cited by examiner

STORAGE IN TIERED ENVIRONMENT WITH CACHE COLLABORATION

BACKGROUND OF THE INVENTION

Field of the Invention

The present invention relates in general to computers, and more particularly to apparatus, method and computer program product embodiments for data storage management in tiered storage environments.

Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise hard disk drives (ENT), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In some tiered storage environments, a heat map of data segments (such as extents) is created by counting the number of accesses to the segments. The data segments are then organized into so-called "hot" and "cold" categories. Hot data may refer to, for example, data that is used more frequently, such as data having a higher number of accesses, reads, writes, and the like over an elapsed time. In contrast, cold data may refer to data that is used less frequently, with less accesses, reads and writes, respectively. Most likely, the hot data is placed on the fastest medium (e.g., SSD), and the cold data will be placed on a slower, more cost effective medium (e.g., SATA). However, the data segments that have not been accessed in a very long time generally remain in the cold category.

By using data heat metrics and other factors, tiered-storage applications may manage data migration based on their long-term performance learning statistics. In one example, a tiered-storage application may "learn" for at most, 24 hours before the application then applies the learned information to migrating existing data in the computing storage environment. While this learning process works efficiently for data characterized by a 24-hour periodic workload, the learning process may not effectively characterize data that is, at one time, "hot" and then forever "cold."

A typical example of the aforementioned one-time "hot" data exists in the Express Industry. Data may be created at the beginning of a deal. This data is hot in the following day since, for example, it may be accessed repeatedly by a customer to query a status of the deal. Once the deal is completed, it is quite possible that the data would never be accessed/used.

A tiering storage management appliance may, if the data is determined to be "hot" the first day, migrate the data to Solid State Device (SSD) storage on the following day. Obviously, however, this migration is not the most advantageous, as there will be no realized performance improvement and SSD space will be wasted. Moreover, since some types of data workloads are friendly to both SSD storage and cache, if these data workloads could be accessed directly from SSD, the cache storage capacity may be reserved for other workloads that are unfriendly to SSD storage, as cache storage capacity is a scarce resource in computing storage environments.

In view of the foregoing, a need exists to better accommodate data in tiered storage environments based on workload type. In addition a need exists for better collaboration of scarce cache resources with the remaining storage tiers. Accordingly, and in view of the foregoing, various system, method, and computer program product embodiments for managing data by a processor in a multi-tiered computing storage environment are provided. In one embodiment, by way of example only, a method for managing data by a processor in a multi-tiered computing storage environment is provided. Input/Output (I/O) statistics are examined from each of cache and device drivers in the computing storage environment. Based on the I/O statistics, a ranking mechanism is applied to differentiate data between at least a cache and a Solid State Drive (SSD) rank. The ranking mechanism migrates data between the cache and SSD rank such that storage space in the cache is reserved for those of the plurality of data workload types having a greater adverse effect on a storage performance characteristic if stored in the SSD rank than if those workload types were stored in the cache.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
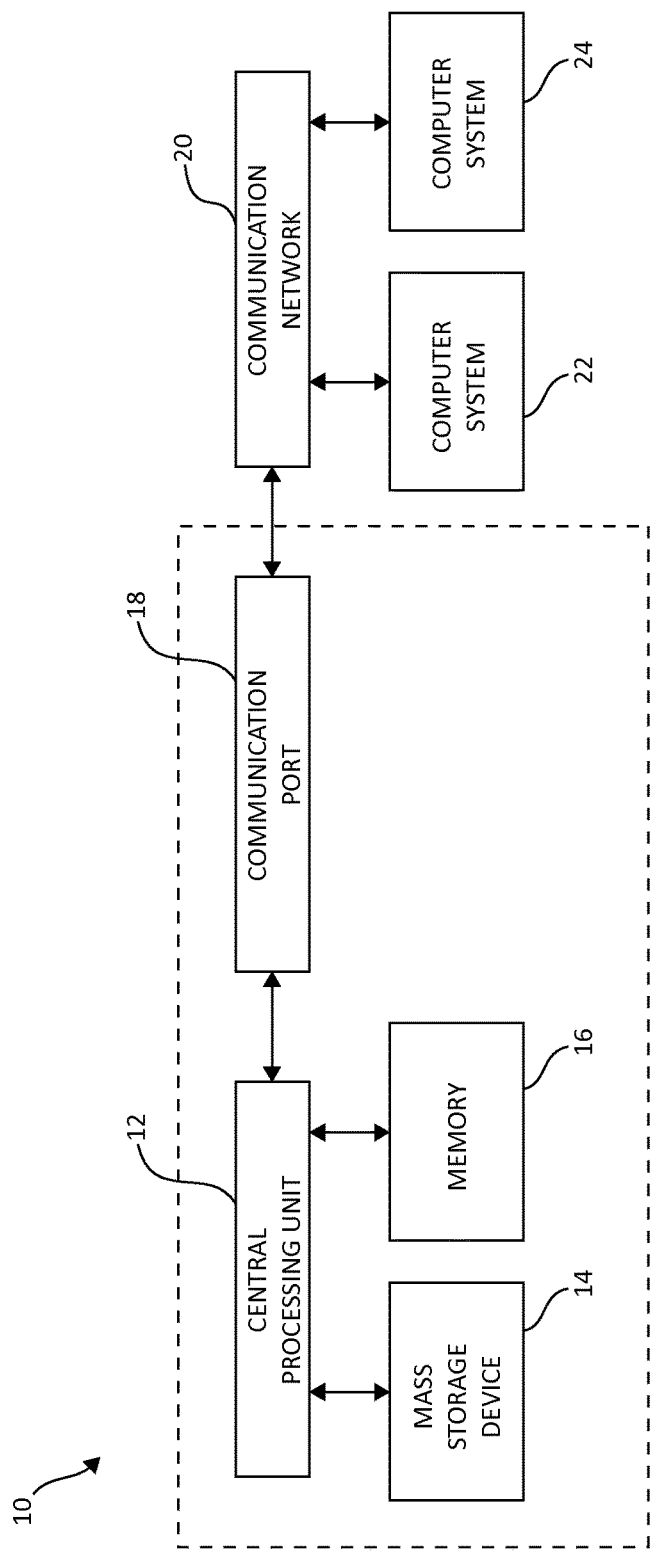
FIG. 1 is a block diagram illustration of an exemplary computing storage environment in accordance with certain embodiments.

The illustrated embodiments provide mechanisms for data management in tiered computing storage environments by implementing, among other aspects, collaborative functionality between a cache manager and the tiering storage manager as will be further described. While one illustrated embodiment refers to a tiered storage environment having SSD devices among a variety of storage devices configured in a tiered arrangement, one of ordinary skill in the art will appreciate that the mechanisms of the present invention are contemplated to be implementable in a variety of computing storage environments.

As previously indicated, current tiered-storage architectures include a variety of storage mediums. These may include such media as enterprise hard disk drives (ENT), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In some tiered storage environments, a heat map of data segments (such as extents) is created by counting the number of accesses to the segments. The data segments are then organized into so-called "hot" and "cold" categories. Hot data is generally data that is used more frequently, such as data having accompanying higher rates of access, reads, and writes, for example. Cold data is generally used less frequently. Most likely, the hot data is placed on the fastest medium (e.g., SSD), and the cold data will be placed on a slower, more cost effective medium (e.g., SATA). However, the data segments that have not been accessed in a very long time generally remain in the cold category.

By using data heat metrics and other factors, tiered-storage applications may manage data migration based on their long-term performance learning statistics. In one example, a tiered-storage application may "learn" for at most, 24 hours before the application then applies the learned information to migrating existing data in the computing storage environment. While this learning process works efficiently for data characterized by a 24-hour periodic workload, the learning process may not effectively characterize data that is, at one time, "hot" and then forever "cold."

A typical example of the aforementioned one-time "hot" data exists in the Express Industry. Data may be created at the beginning of a deal. This data is hot in the following day since, for example, it may be accessed repeatedly by a customer to query a status of the deal. Once the deal is completed, it is quite possible that the data would never be accessed/used.

A tiering storage management appliance may, if the data is determined to be "hot" the first day, migrate the data to Solid State Device (SSD) storage on the following day. Obviously, however, this migration is not the most advantageous, as there will be no realized performance improvement and SSD space will be wasted. Moreover, since some types of data workloads are friendly to both SSD storage and cache, if these data workloads could be accessed directly from SSD, the cache storage capacity may be reserved for other workloads that are unfriendly to SSD storage, as cache storage capacity is a scarce resource in computing storage environments.

The mechanisms of the illustrated embodiments address the need to better accommodate data in tiered storage environments based on workload type, such as the data periodicity associated with a particular workload as will be further described in detail. In addition, the mechanisms of the illustrated embodiments also serve to better allocate scarce cache resources to those types of data workloads best suited and/or needing the cache storage space, again as will be described.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
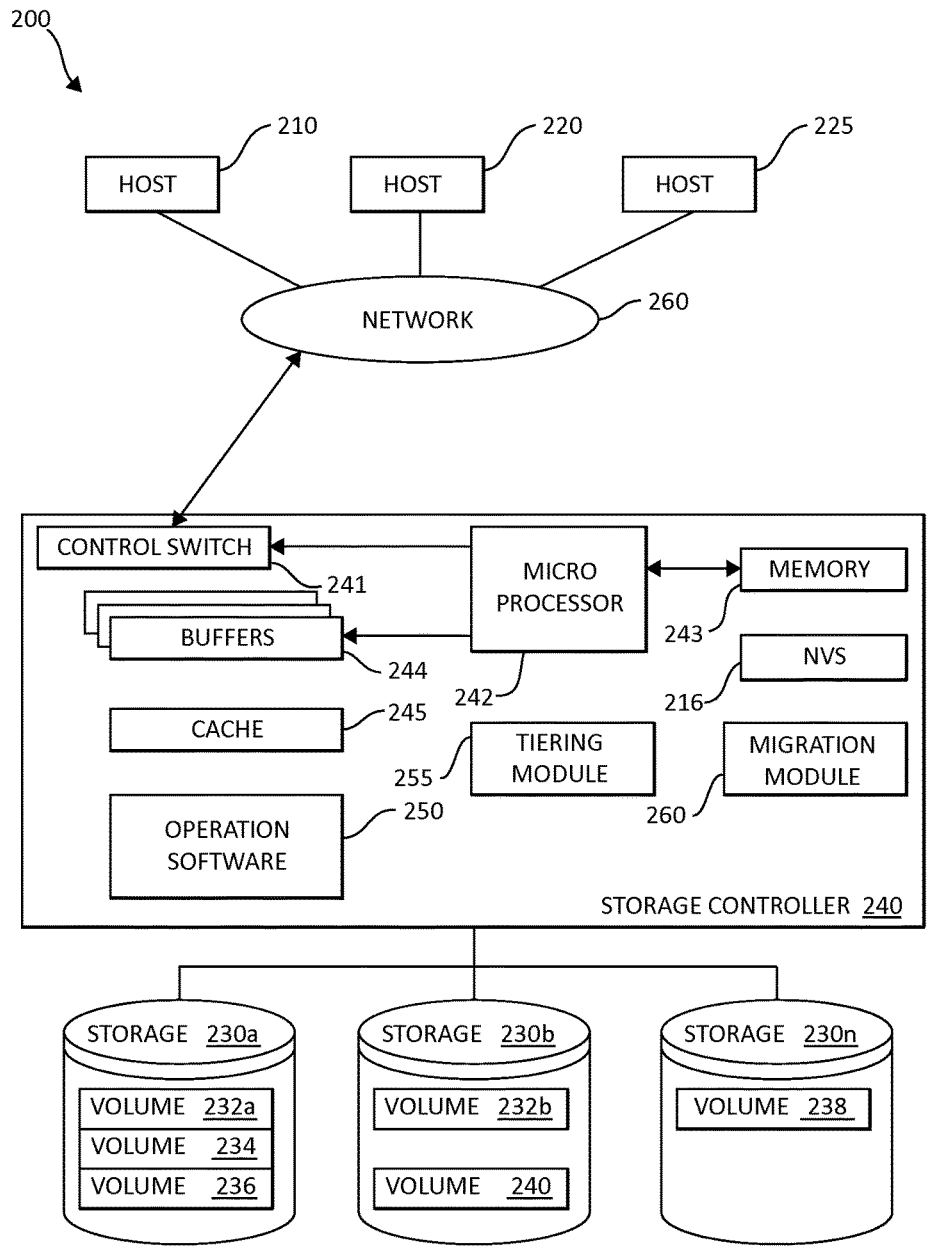
FIG. 2 is a block diagram of a hardware structure of a data storage system according to various aspects of certain embodiments.

FIG. 2 is an exemplary block diagram 200 showing a hardware structure of a data storage and data management system that may be used in the overall context of tiered storage management functionality as will be herein described. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as an IBM® DS8000™ storage subsystem, although one of ordinary skill in the art will recognize that a variety of deduplication hardware and software, separately or in combination, may be utilized to implement the storage management functionality according to aspects of the illustrated embodiments. Moreover, it should be noted that particular storage system hardware and software might be useful in one embodiment, and thereby selected by one of ordinary skill in the art, for example.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein. In one embodiment, the cache 245 may include a "cache manager" implemented for purposes of management of data in the cache 245.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. The ranks 230a, 230b, and 230n may correspond to SSD devices, ENT devices, and the like, as previously described and as one of ordinary skill in the art will appreciate. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data tiering module 255 and a data migration module 260. The data tiering module 255 and data migration module 260 may operate in conjunction with each and every component of the storage controller 240, the hosts 210, 220, 225, and storage devices 230. The data tiering module 255 and data migration module 260 may be structurally one complete module or may be associated and/or included with other individual modules. The data tiering module 255 and data migration module 260 may also be located in the cache 245 or other components, as one of ordinary skill in the art will appreciate.

The data tiering module 255 and data migration module 260 may individually and/or collectively perform various aspects of the present invention as will be further described.

For example, the data tiering module 255 may implement tiering storage management functions as will be further described. The data migration module 260 may work in conjunction with the cache 245 and tiering module 255 to migrate data according to the storage management decisions carried out by the tiering module 255. In one exemplary embodiment, the data tiering module 255 may be implemented as a tiering appliance and/or tiering application. Herein, the functionality of the data tiering module may be described by use of a "tiered storage manager" terminology.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data tiering module 255, and the data migration module 260, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
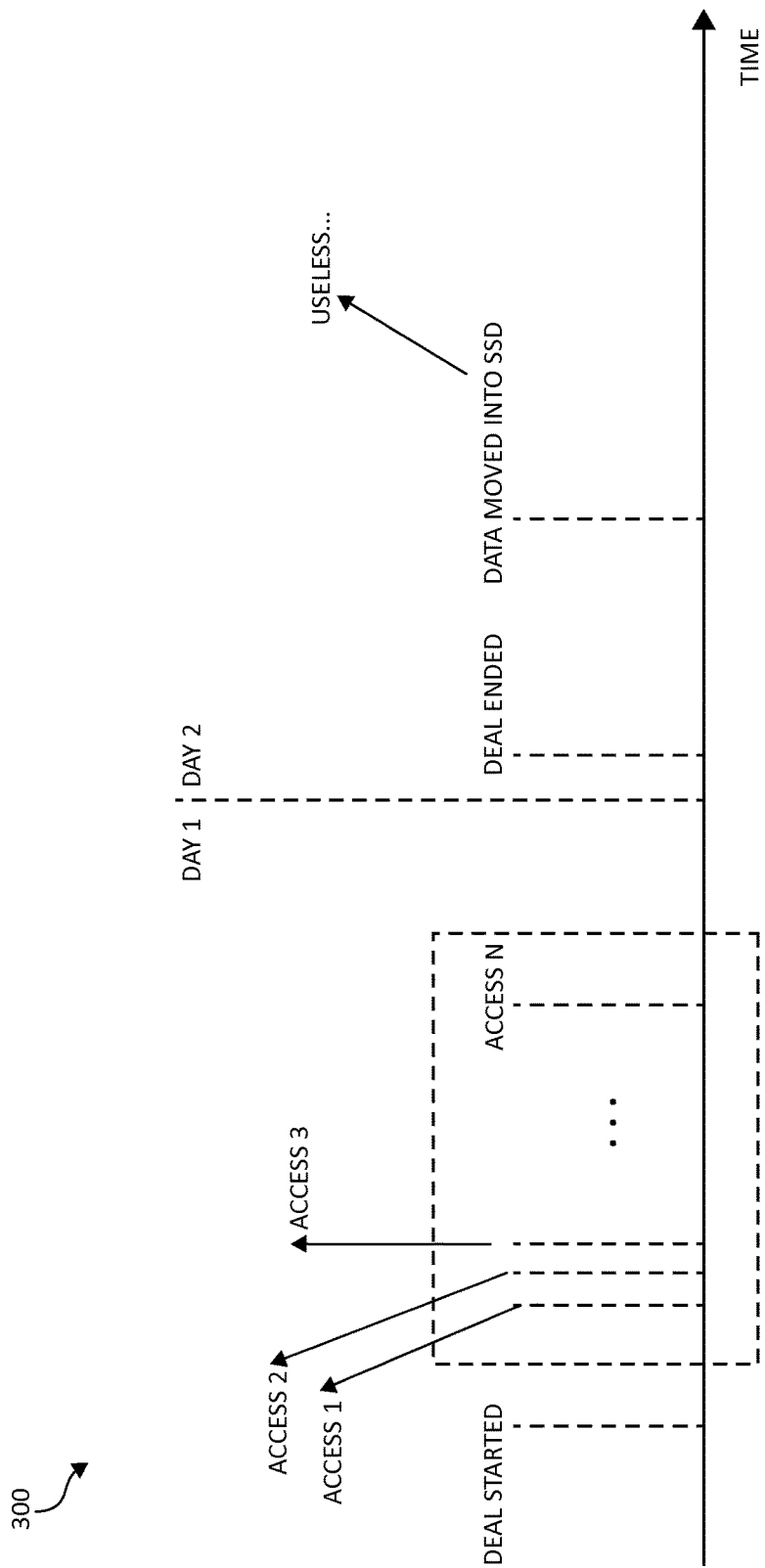
FIG. 3 is a block diagram illustration of an exemplary scenario found in the express industry across two days of elapsed time.

FIG. 3, following, illustrates, in block diagram form, an exemplary scenario 300 commonly found in the express industry with regard to data initiation, storage, and management. FIG. 3 then illustrates exemplary challenges that are placed on storage management systems to effectively and efficiently migrate data.

Scenario 300 begins chronologically on the left of the illustration and continues as time elapses from left to right as shown along the time axis. A deal is made, and data affiliated with the new deal is initiated and stored in the tiered computing storage environment. A customer repeatedly accesses portions, or all of this data as the day progresses, here represented as "Accesses 1 . . . N" as shown.

As Day 1 elapses and concludes, the customer continues to access the information. Day 2 begins, and shortly thereafter, the deal is concluded as shown. During the elapsed time in scenario 300, the tiering application is undergoing a learning process to categorize the information. The tiering application may conclude, based on the activity of the data's access pattern, that the information associated with this deal is "hot," and best served by being migrated into SSD, which is shown at later point in the elapsed day. By this time, however, the data may be accessed on a very limited basis by the customer, or not at all. Accordingly, the migration of the data into SSD in this scenario tends to waste the scarce and expensive storage space in the SSD tier for data that is unused.

Figure 4:
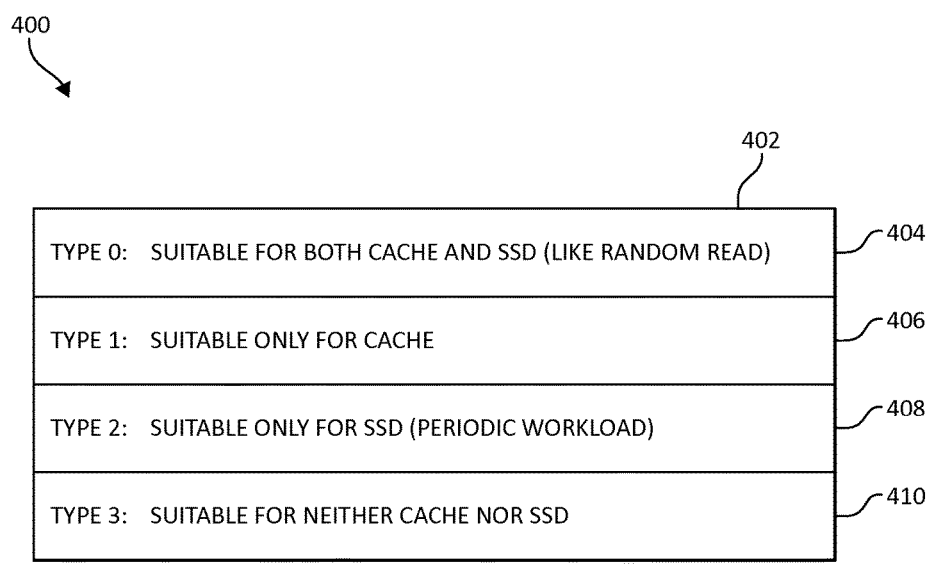
FIG. 4 is a table illustration of exemplary categories for data workload types that are organized according to various aspects of certain embodiments.

Turning now to FIG. 4, following, an exemplary table 400 of data workflow classifications is illustrated. Table 400 reflects a greater need to identify and differentiate between data structures that are best accommodated in the cache, SSD, and remaining tiers. In other words, the mechanisms of the illustrated embodiments engender cooperation between cache and smart-tiering storage applications to perform more effective data storage tiering.

In one embodiment, based on Input/Output (I/O) statistics gathered from both the cache and storage devices, a smart-tiering application may divide data in a novel ranking mechanism as will be further described. For those random read workloads, which are friendly to both SSD and cache, the random read workloads are retained only in SSD, and directly accessed from SSD. If the random read workloads are not in SSD, the workloads are migrated to SSD.

In this manner, valuable cache storage space is retained for other data workload types that are unfriendly to SSD devices. In conjunction with the above, when workloads friendly to both are migrated to SSD, workloads unfriendly to SSD may be migrated out of SSD. This migration then opens up SSD device storage space as well. Accordingly, various mechanisms of the illustrated embodiments enable data storage environments to exhibit flexibility and responsiveness in the face of aperiodic data workloads.

Returning to FIG. 4, one embodiment of various workload data types 402 is illustrated in which the mechanisms of the present invention may implement in a data tiering and migration methodology. A first type 404, Type 0, is reserved for those data workload types that are suitable for both cache and SSD devices, such as random read workloads. A second type 406, Type 1, is suitable only for cache. A third type 408, Type 2, is suitable only for SSD devices. This type includes workloads such as periodic workloads. Finally, a fourth type 410, Type 3, is reserved for those data workloads that are suitable for neither cache nor SSD devices.

In one embodiment, to implement the data workload types shown in FIG. 4, cooperation is needed among the cache manager and a tiered storage manager and associated device driver(s). In the case of cache, the cache manager should collect I/O statistics for data that is cached, and transfer that information to the smart-tiered storage application. For the smart-tiered application, the application should receive I/O statistics from both cache and associated device drivers, and then implement and categorize the incoming data according to the four data types previously mentioned.

An exemplary ranking mechanism may be implemented for the workload data types shown in FIG. 4. First, for Type 0 data that is suitable for both cache and SSD, the data is migrated into SSD, notwithstanding whether the cache has cached the data or not. If the data has not been cached, the tiering application may simply read the data directly from SSD. It is also acceptable that this data workload is not promoted into cache. As one of ordinary skill in the art will appreciate, the response time between cache and SSD is typically not significant. In this way, additional cache space may be retained for workloads that are unfriendly to SSD.

Second, for Type 1 data that is suitable only for cache, the data is migrated out of SSD notwithstanding the data has been cached or not. For Type 2 data that is suitable only for SSD (e.g., periodic workload data), the data is migrated into SSD. Finally, for type 3 data that is suitable for neither cache nor SSD, the data is migrated out of SSD if possible. In one embodiment, at the device driver level, it may be beneficial to support smaller block data migration, and thereby performing dynamic data migration operations more quickly and efficiently.

In a specific embodiment, data having a sequential read workload may be assigned specifically to the suitable only for cache, Type 1 category. The sequentiality may be compared against a predetermined threshold, for example.

In this manner, workloads like the exemplary scenario presented in FIG. 3, previously, may be moved to the SSD tier sooner. In addition, I/O performance may be improved.

Figure 5:
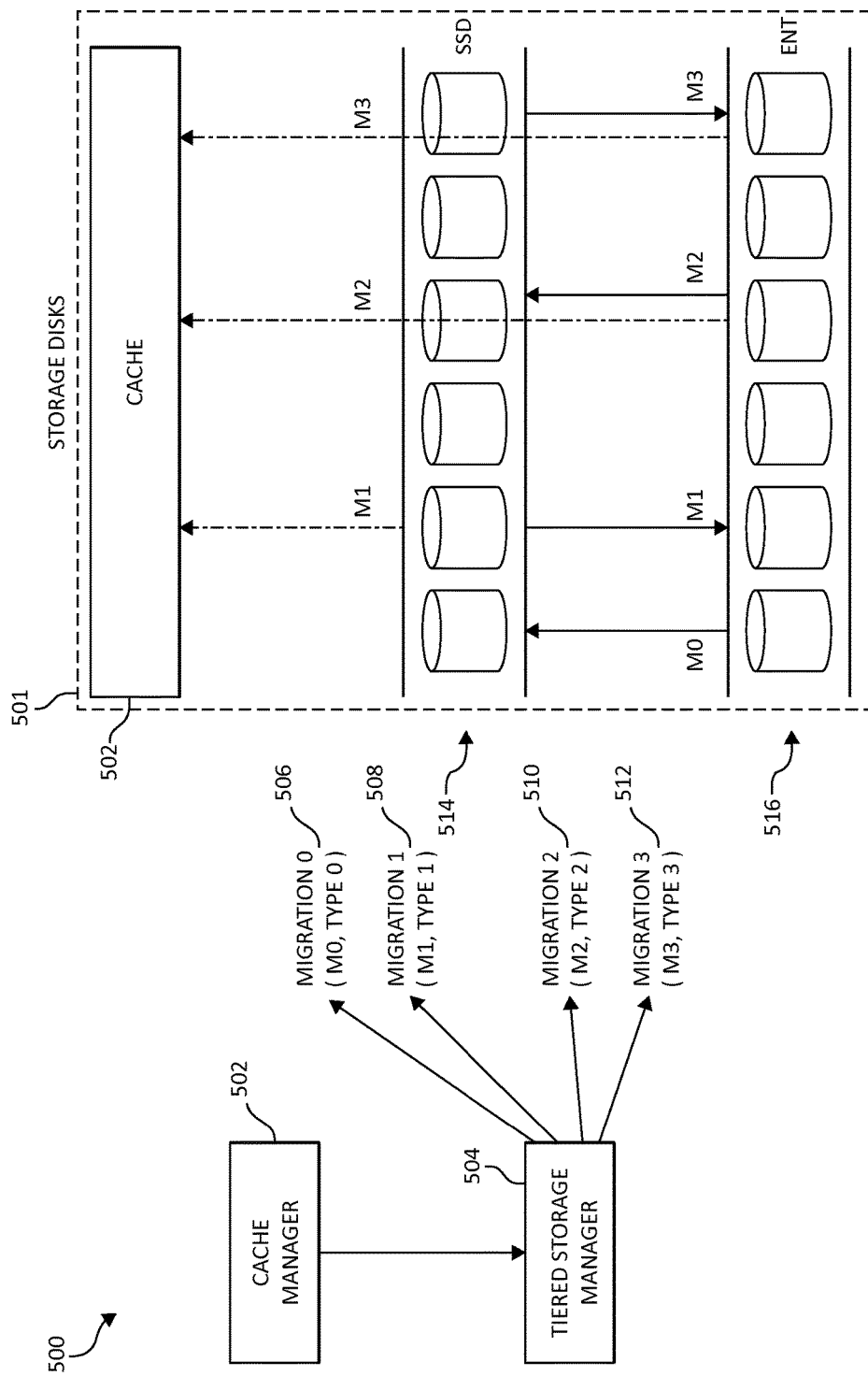
FIG. 5 is a block diagram illustration of exemplary migrations according to various data workload type categorizations, and specifically illustrating collaborative functionality between a tiering application and cache, according to certain embodiments.

Turning now to FIG. 5, following, a block diagram of exemplary data management functionality 500 is illustrated in which various aspects of the present invention may be implemented. As shown, collaborative functionality between the cache manager 502 and the tiered storage manager 504 allows for data migrations 506, 508, 510, and 512 to occur according to the data workload types in which the incoming data is classified. Cache/cache manager 502 refers I/O statistics collected therein to the smart-tiered application 504 as shown. Here again, while not pictured, the storage device drivers also refer I/O statistics therein to the smart-tiered application 504 as previously mentioned. The migrations 506-512 are also represented in terms of M0 for Type 0 data, M1 for Type 1 data, M2 for Type 2 data, and M3 for Type 3 data, respectively as shown.

Also represented in functionality 500 is storage disks enclosure 501, which incorporates a cache tier 502, SSD tier 514, and Enterprise (ENT) device tier 516. The various migrations M0, M1, M2, and M3 are shown between the various tiers 502, 514, and 516.

In one example, M0 migrates data from the Enterprise tier 516 to the SSD tier 514 for Type 0 data (data suitable for both cache and SSD), such as random read data as shown by the solid line. In another example, M1 migrations are represented for Type 1 data (data suitable only for cache) which is moved out of SSD tier 514 whether the data is in cache 502 or not. In another example, M2 migrations for Type 2 data (data suitable only for SSD), such as periodic workload data, is migrated into the SSD tier 514 where possible. In a final example, M3 migrations for Type 3 data (data suitable for neither cache nor SSD) migrate data out of the SSD tier 514 into Enterprise tier 416 where possible.

Figure 6:
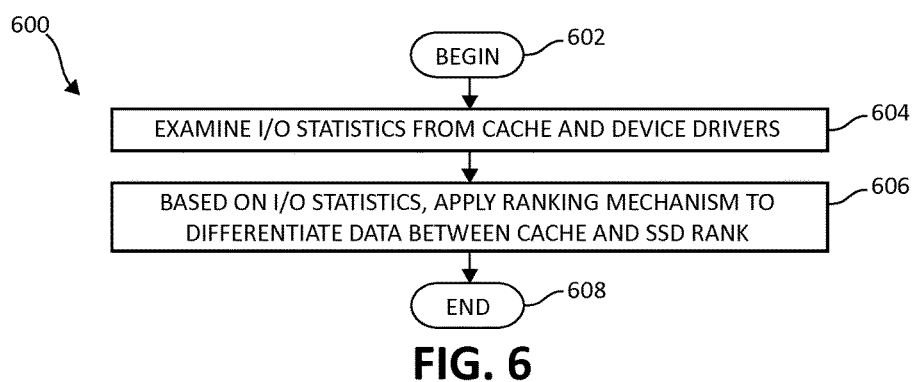
FIG. 6 is a flow chart diagram illustration of an exemplary method for data management in a tiered computing storage environment with cache collaboration, in which various aspects of the present invention may be implemented.

Turning now to FIG. 6, an exemplary method 600 for performing data management in a tiered computing storage environment, in which various aspects of the illustrated embodiments may be implemented, is depicted. Method 600 begins (step 602) with the examination of various I/O statistics from both the cache and device drivers, which are supplied to a smart-tiered application for analysis and data workload classification and migration (step 604). In a subsequent step 606, based on the various I/O statistics, the ranking mechanism is applied to differentiate data between the cache and SSD ranks, and whereupon in the ranking mechanism, data is migrated between the cache and SSD ranks such that storage space in the cache is reserved for those of the data workload types that have a greater adverse effect on a storage performance characteristic (i.e., those that are unfriendly to) the SSD rank than if those same data workload types were stored in the cache. In other words, cache storage space is reserved primarily for data workload types that are suitable only for cache, and SSD storage space is reserved primarily for data workload types that are suitable only for SSD, such as periodic workloads. The method 600 then ends (step 608).

Figure 7:
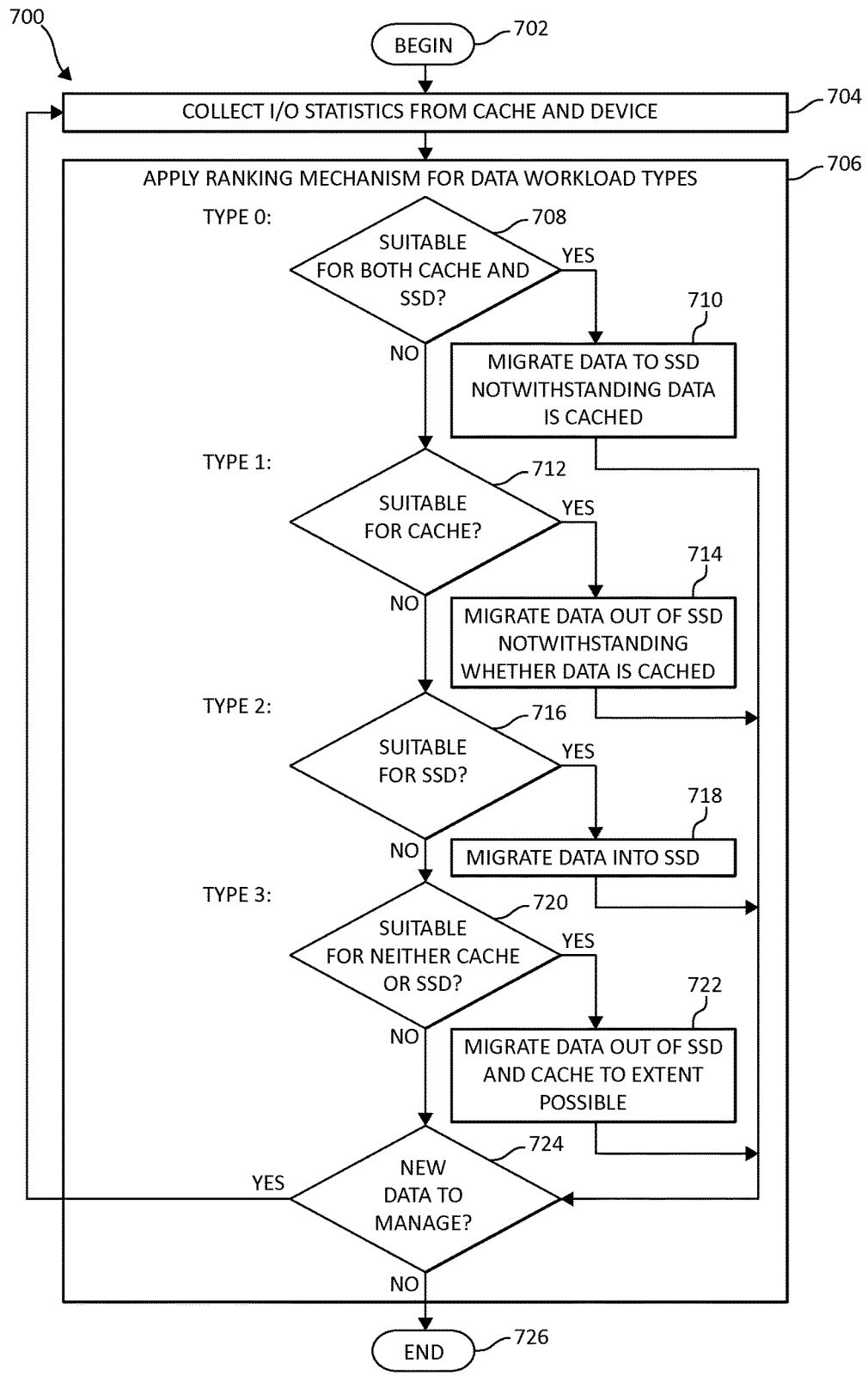
FIG. 7 is a flow chart diagram illustration of an additional exemplary method for data management in a tiered computing storage environment with accompanying cache collaboration with a tiering application; again in which various aspects of the present invention may be implemented.

FIG. 7, following, shown by method 700 in flow chart diagram format, further illustrates data management functionality previously described herein and cross-collaboration between the cache and smart-tiered application to effect data migration functionality according to various aspects of the present invention. Method 700 begins (step 702) with the collection of I/O statistics from the cache and device drivers, which are provided to the smart-tiering application (step 704).

A ranking mechanism 706 is then applied to the incoming data based on the I/O statistics. For Type 0 data, if the incoming data is determined to be suitable for both cache and SSD tiers (step 708), then the data is migrated into SSD notwithstanding whether the data has been cached (step 710). For Type 1 data, if the incoming data is determined to be suitable for cache only (step 712), then the data is migrated out of SSD notwithstanding whether the data is cached (step 714). For Type 2 data, if the incoming data is determined to be suitable only for SSD (step 716), then the data is migrated into SSD (step 718). Finally for Type 3 data, if the incoming data is determined suitable for neither cache nor SSD (step 720), the data is migrated out of SSD and cache to the extent possible (step 722).

In step 724, if there is new data to manage, the method 700 returns to step 704 as shown. Otherwise, the method 700 ends (step 726). As one of ordinary skill in the art will appreciate, the steps in method 700 may be changed or performed in a particular order to suit a particular situation or implementation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing data by a processor in a multi-tiered computing storage environment, comprising:
   examining Input/Output (I/O) statistics between a cache within a tiered storage controller and a plurality of storage devices managed by the tiered storage controller in the computing storage environment; and
   based on the I/O statistics, apply a ranking mechanism to differentiate data between at least the cache and a Solid State Drive (SSD) rank of an SSD tier of the multi-tiered computing storage environment, wherein the ranking mechanism migrates data between the cache and SSD rank of the SSD tier such that storage space in the cache is reserved for those of a plurality of data workload types of storage operations between hosts and the multi-tiered computing storage environment having a greater adverse effect on a storage performance characteristic if stored in the SSD rank of the SSD tier than if those workload types were stored in the cache; wherein applying the ranking mechanism defines a plurality of data categories, a suitable for both cache and SSD category which further includes random read workloads; a suitable only for cache category which further includes sequential read workloads having a sequentiality above a particular threshold; a suitable only for SSD category which further includes periodic workloads; and a suitable for neither cache nor SSD category; wherein data associated with the plurality of workload types is assigned between the cache, SSD rank of the SSD tier, and an alternative storage rank based at least in part on the storage performance characteristic.

2. The method of claim 1, further including assigning those of the plurality of workload types exhibiting random read I/O operations greater than a particular threshold to the suitable for both cache and SSD category.

3. The method of claim 1, further including assigning those of the plurality of workload types exhibiting sequential reads greater than the particular threshold to the suitable only for cache category.

4. The method of claim 1, further including assigning those of the plurality of workload types exhibiting a workload periodicity greater than a predetermined threshold to the suitable only for SSD category.

5. The method of claim 1, further including assigning those of the plurality of workload types not assigned to the suitable for both cache and SSD category, suitable only for cache category, and suitable only for SSD category to the suitable for neither cache nor SSD category.

6. The method of claim 2, wherein data assigned to the suitable for both cache and SSD category is migrated into the SSD rank of the SSD tier notwithstanding whether the data has been cached in the cache.

7. A system for managing data in a multi-tiered computing storage environment, comprising:
   a processor, operable in the computing storage environment, wherein the processor:
     examines Input/Output (I/O) statistics between a cache within a tiered storage controller and a plurality of storage devices managed by the tiered storage controller in the computing storage environment, and
     based on the I/O statistics, applies a ranking mechanism to differentiate data between at least the cache and a Solid State Drive (SSD) rank of an SSD tier of the multi-tiered computing storage environment, wherein the ranking mechanism migrates data between the cache and SSD rank of the SSD tier such that storage space in the cache is reserved for those of a plurality of data workload types of storage operations between hosts and the multi-tiered computing storage environment having a greater adverse effect on a storage performance characteristic if stored in the SSD rank of the SSD tier than if those workload types were stored in the cache; wherein applying the ranking mechanism defines a plurality of data categories, a suitable for both cache and SSD category which further includes random read workloads; a suitable only for cache category which further includes sequential read workloads having a sequentiality above a particular threshold; a suitable only for SSD category which further includes periodic workloads; and a suitable for neither cache nor SSD category; wherein data associated with the plurality of workload types is assigned between the cache, SSD rank of the SSD tier, and an alternative storage rank based at least in part on the storage performance characteristic.

8. The system of claim 7, wherein the processor assigns those of the plurality of workload types exhibiting random read I/O operations greater than a particular threshold to the suitable for both cache and SSD category.

9. The system of claim 7, wherein the processor assigns those of the plurality of workload types exhibiting sequential reads greater than the particular threshold to the suitable only for cache category.

10. The system of claim 7, wherein the processor assigns those of the plurality of workload types exhibiting a workload periodicity greater than a predetermined threshold to the suitable only for SSD category.

11. The system of claim 7, wherein the processor assigns those of the plurality of workload types not assigned to the suitable for both cache and SSD category, suitable only for cache category, and suitable only for SSD category to the suitable for neither cache nor SSD category.

12. The system of claim 8, wherein the processor migrates data assigned to the suitable for both cache and SSD category into the SSD rank of the SSD tier notwithstanding whether the data has been cached in the cache.

13. A computer program product for managing data by a processor in multi-tiered computing storage environment, the computer program product comprising a computer-readable storage medium having computer-readable program code portions stored therein, the computer-readable program code portions comprising:

a first executable portion that examines Input/Output (I/O) statistics between a cache within a tiered storage controller and a plurality of storage devices managed by the tiered storage controller in the computing storage environment; and a second executable portion that, based on the I/O statistics, applies a ranking mechanism to differentiate data between at least the cache rank and a Solid State Drive (SSD) rank of an SSD tier of the multi-tiered computing storage environment, wherein the ranking mechanism migrates data between the cache and SSD rank of the SSD tier such that storage space in the cache is reserved for those of a plurality of data workload types of storage operations between hosts and the multi-tiered computing storage environment having a greater adverse effect on a storage performance characteristic if stored in the SSD rank of the SSD tier than if those workload types were stored in the cache; wherein applying the ranking mechanism defines a plurality of data categories, a suitable for both cache and SSD category which further includes random read workloads; a suitable only for cache category which further includes sequential read workloads having a sequentiality above a particular threshold; a suitable only for SSD category which further includes periodic workloads; and a suitable for neither cache nor SSD category; wherein data associated with the plurality of workload types is assigned between the cache, SSD rank of the SSD tier, and an alternative storage rank based at least in part on the storage performance characteristic.

14. The computer program product of claim 13, further including a third executable portion that assigns those of the plurality of workload types exhibiting random read I/O operations greater than a particular threshold to the suitable for both cache and SSD category.

15. The computer program product of claim 13, further including a third executable portion that assigns those of the plurality of workload types exhibiting sequential reads greater than the particular threshold to the suitable only for cache category.

16. The computer program product of claim 13, further including a fourth executable portion that assigns those of the plurality of workload types exhibiting a workload periodicity greater than a predetermined threshold to the suitable only for SSD category.

17. The computer program product of claim 13, further including a fourth executable portion that assigns those of the plurality of workload types not assigned to the suitable for both cache and SSD category, suitable only for cache category, and suitable only for SSD category to the suitable for neither cache nor SSD category.

18. The computer program product of claim 14, wherein data assigned to the suitable for both cache and SSD category is migrated into the SSD rank of the SSD tier notwithstanding whether the data has been cached in the cache.

* * * * *